(12) United States Patent
Wang

(10) Patent No.: US 11,365,066 B2
(45) Date of Patent: Jun. 21, 2022

(54) DUAL-LAYER LINEAR SORTER

(71) Applicant: BEIJING JINGDONG QIANSHI TECHNOLOGY CO., LTD., Beijing (CN)

(72) Inventor: Guopeng Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/414,557

(22) PCT Filed: Jan. 2, 2020

(86) PCT No.: PCT/CN2020/070128
§ 371 (c)(1),
(2) Date: Jun. 16, 2021

(87) PCT Pub. No.: WO2020/147592
PCT Pub. Date: Jul. 23, 2020

(65) Prior Publication Data
US 2022/0009724 A1    Jan. 13, 2022

(30) Foreign Application Priority Data

Jan. 15, 2019  (CN) .......................... 201910037022.8

(51) Int. Cl.
*B65G 47/49*  (2006.01)
*B65G 15/28*  (2006.01)
(Continued)

(52) U.S. Cl.
CPC ............. *B65G 47/49* (2013.01); *B65G 15/28* (2013.01); *B65G 23/06* (2013.01); *B65G 47/44* (2013.01); *B65G 2203/0216* (2013.01)

(58) Field of Classification Search
CPC ........ B65G 47/49; B65G 15/28; B65G 23/06; B65G 47/04; B65G 47/44; B65G 1/04; B65G 17/345; B65G 47/48; B65G 47/46
(Continued)

(56) References Cited

U.S. PATENT DOCUMENTS

| 4,805,780 A | * | 2/1989 | Solund | ...................... B07C 3/18 |
| | | | | 198/714 |
| 5,441,141 A | * | 8/1995 | Bonnet | ...................... B07C 3/04 |
| | | | | 198/786 |

(Continued)

FOREIGN PATENT DOCUMENTS

| CN | 106956887 A | 7/2017 |
| CN | 107020247 A | 8/2017 |

(Continued)

OTHER PUBLICATIONS

International Search Report dated Mar. 27, 2020 for PCT international application No. PCT/CN2020/070128.

*Primary Examiner* — James R Bidwell
(74) *Attorney, Agent, or Firm* — Qinghong Xu

(57) ABSTRACT

A dual-layer linear sorter includes a delivery mechanism, a first feeding mechanism, a second uploading mechanism, a slewing mechanism, and a driving mechanism, the delivery mechanism is ring-shaped and includes upper and lower layers; the running direction of the upper layer is a first direction, the running direction of the lower layer is a second direction; the second direction is opposite to the first direction; the first feeding mechanism is close to the upper layer, and is docked with one end of the delivery mechanism; the second feeding mechanism is close to the lower layer and is docked with the other end of the delivery mechanism; the driving mechanism can drive the delivery mechanism to run; a part of the goods can be delivered to the upper layer via the (Continued)

first uploading mechanism; another part of goods can be delivered to the lower layer via the second uploading mechanism.

9 Claims, 9 Drawing Sheets

(51) Int. Cl.
*B65G 23/06* (2006.01)
*B65G 47/44* (2006.01)

(58) Field of Classification Search
USPC .............. 198/370.03, 370.06, 370.09, 370.1
See application file for complete search history.

(56) References Cited

U.S. PATENT DOCUMENTS

| | | | |
|---|---|---|---|
| 2011/0150612 A1 | 6/2011 | Gruber et al. | |
| 2015/0360869 A1* | 12/2015 | Bastian, II | B65G 43/08 |
| | | | 198/370.06 |
| 2021/0139253 A1* | 5/2021 | Wang | B07C 5/36 |

FOREIGN PATENT DOCUMENTS

| | | | | |
|---|---|---|---|---|
| CN | 208135406 U | | 11/2018 | |
| CN | 209701663 U | | 11/2019 | |
| WO | 95/13977 | * | 5/1995 | ............. B65G 47/38 |
| WO | 2004083084 | * | 9/2004 | ............. B65G 17/16 |

\* cited by examiner

DUAL-LAYER LINEAR SORTER

CROSS REFERENCE

This application is based upon International Application No. PCT/CN2020/070128, filed on Jan. 2, 2020, and claims priority to Chinese Patent Application No. 201910037022.8, titled "Dual-layer linear sorter", filed on Jan. 15, 2019, the content of which is hereby incorporated by reference in its entirety.

TECHNICAL FIELD

The present disclosure relates to the technical field of logistics sorting, and in particular to a dual-layer linear sorter.

BACKGROUND

In related art, the sorter usually includes an annular conveyor belt, the conveyor belt is looped to form an upper layer and a lower layer. On the upper layer, the goods are fed and placed on the outer surface of the conveyor belt and delivered from one end of the conveyor belt to the other end. Since the goods are placed on the outer surface of the conveyor belt, when the goods are delivered to the outer surface of the upper conveyor belt, the outer surface of the upper layer faces upwards, and when the goods are delivered to the outer surface of the lower conveyor belt, the outer surface of the lower layer faces downwards. That is, the conveyor belt is upside down, so that the conveyor belt running to the lower layer cannot carry goods. In other words, in the entire annular conveyor belt, only the conveyor belt running to the upper layer can carry goods, and during the running of the upper conveyor belt, the lower conveyor belt is idling, causing the lower conveyor belt to be unusable during operation, resulting in a lot of waste of resources and time. In a limited time, more goods cannot be sorted, and the sorting efficiency is low.

SUMMARY

The present disclosure provides dual-layer linear sorter which includes a delivery mechanism, a first feeding mechanism, a second feeding mechanism, a slewing mechanism and a driving mechanism. The delivery mechanism is ring-shaped and configured to include an upper layer and a lower layer, a running direction of the upper layer is a first direction, and a running direction of the lower layer is a second direction, the first direction is from one end of the delivery mechanism to the other end of the delivery mechanism, and the second direction is opposite to the first direction. The first feeding mechanism is close to the upper layer of the delivery mechanism and is docked with one end of the delivery mechanism. The second feeding mechanism is close to the lower layer of the delivery mechanism and is docked with the other end of the delivery mechanism. the slewing mechanism is connected to one end of the delivery mechanism. The driving mechanism is connected to the other end of the delivery mechanism.

Where, the driving mechanism can drive the delivery mechanism to circulate in a loop between the driving mechanism and the slewing mechanism, a part of goods can be delivered to the upper layer of the delivery mechanism via the first feeding mechanism, and delivered and sorted along the first direction, another part of the goods are delivered to the lower layer of the delivery mechanism via the second feeding mechanism, and delivered and sorted in the second direction.

BRIEF DESCRIPTION OF THE DRAWINGS

By considering the following detailed description of the preferred embodiments of the present disclosure in conjunction with the accompanying drawings, various objectives, features, and advantages of the present disclosure will become more apparent. The drawings are merely exemplary illustrations of the present disclosure, and are not necessarily drawn to scale. In the drawings, the same reference numerals always refer to the same or similar parts.

DETAILED DESCRIPTION

Figure 1:
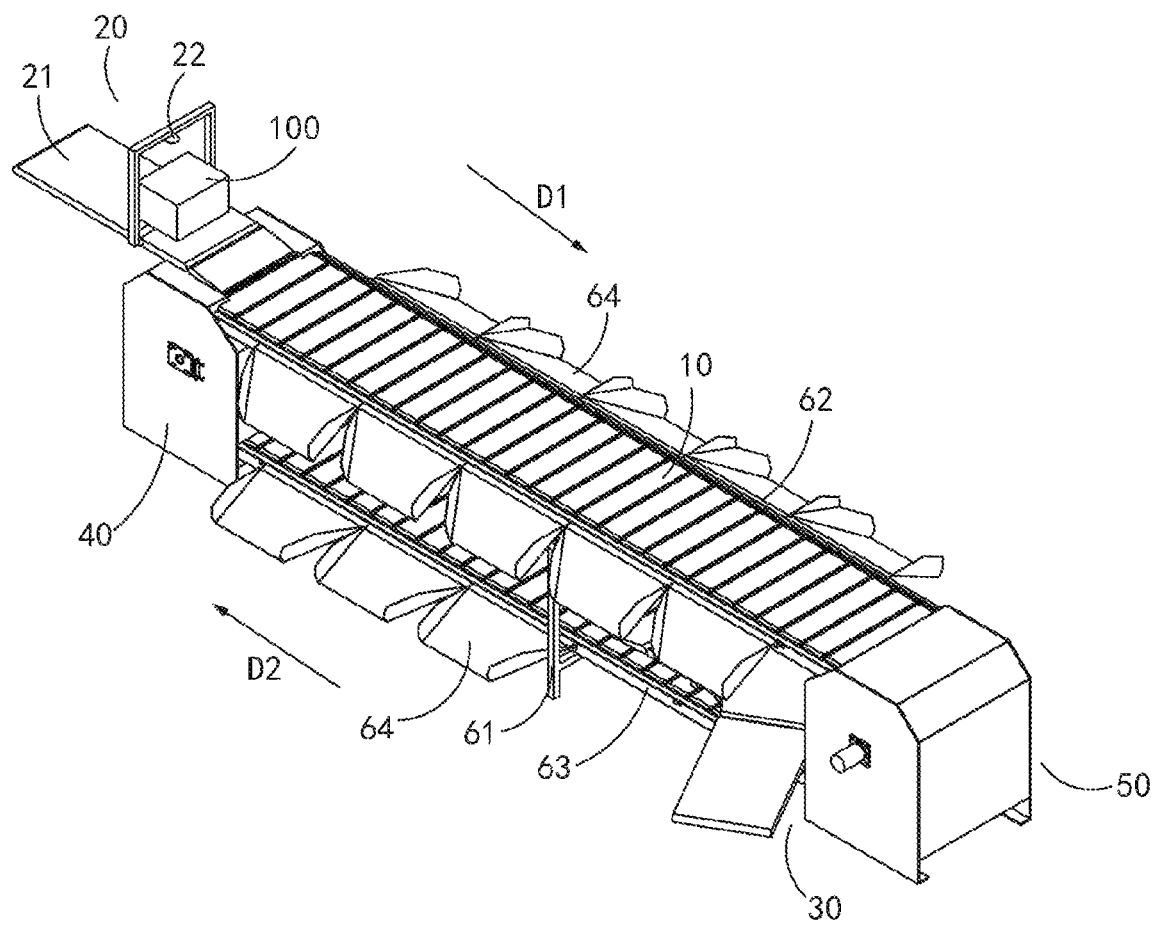
FIG. 1 is a perspective view of a dual-layer linear sorter according to one or more embodiment of the present disclosure.

Exemplary embodiments will now be described more fully with reference to the accompanying drawings. However, the exemplary embodiments can be implemented in various forms, and should not be construed as being limited to the embodiments set forth herein. On the contrary, these embodiments are provided to make the present disclosure more comprehensive and complete, and to fully convey the concept of exemplary embodiments to those skilled in the art. The same reference numerals in the drawings indicate the same or similar structures, and thus their detailed descriptions will be omitted.

The embodiments may use relative terms, such as "lower" or "bottom" and "higher" or "top" to describe the relative relationship between one component of the icon and another component. It can be understood that if the device of the icon is turned upside down, the components described on the "lower" side will become the components on the "higher" side. In addition, when a layer is "on" another layer or substrate, it may mean that it is "directly" on another layer or substrate, or that a layer is on another layer or substrate, or that a layer is sandwiched between other layers or substrates.

Figure 2:
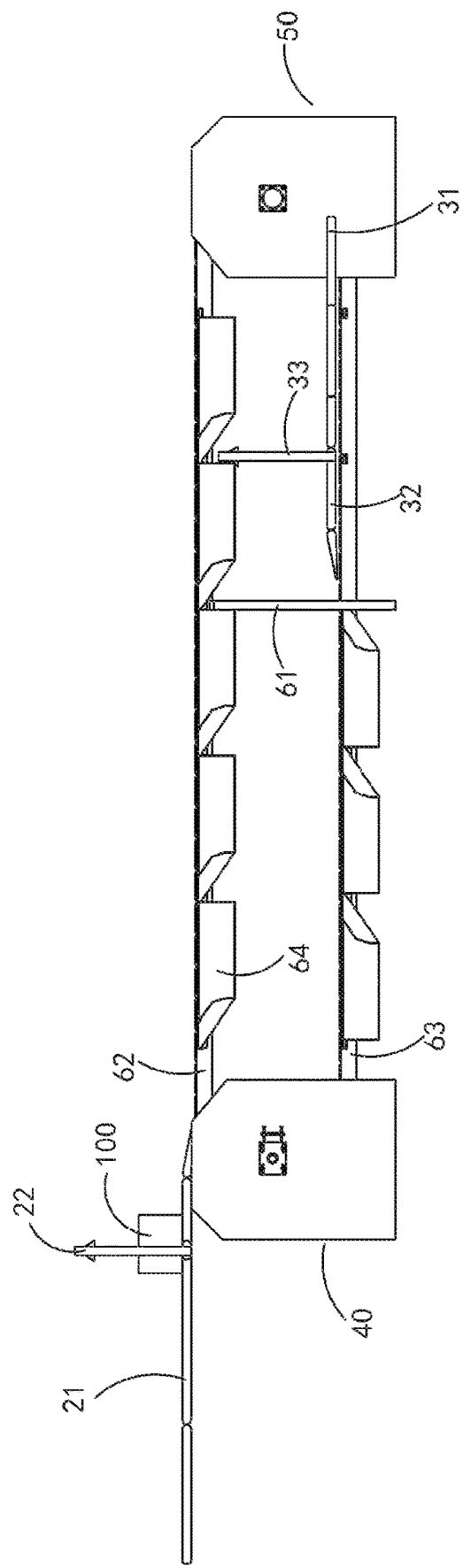
FIG. 2 is a side view of a dual-layer linear sorter according to one or more embodiment of the present disclosure.

The present disclosure provides a dual-layer linear sorter for delivering and sorting goods 100. As shown in FIGS. 1 and 2, the dual-layer linear sorter includes a delivery mechanism 10, a first feeding mechanism 20, a second feeding mechanism 30, a slewing mechanism 40 and a driving mechanism 50. The delivery mechanism 10 is ring-shaped and is configured to include an upper layer and a lower layer. The running direction of the upper layer is the first direction D1, and the running direction of the lower layer is the second direction D2, the first direction D1 is from one end of the delivery mechanism 10 to the other end of the delivery mechanism 10, and the second direction D2 is opposite to the first direction D1. The first feeding mechanism 20 is close to the upper layer of the delivery mechanism 10 and is docked with one end of the delivery mechanism 10. The second feeding mechanism 30 is close to the lower layer of the delivery mechanism 10 and is docked with the other end of the delivery mechanism 10. The slewing mechanism 40 is connected to one end of the delivery mechanism 10. The driving mechanism 50 is connected to the other end of the delivery mechanism 10.

Where, the driving mechanism 50 can drive the delivery mechanism 10 to circulate in a loop between the driving mechanism 50 and the slewing mechanism 40, a part of the goods 100 can be delivered to the upper layer of the delivery mechanism 10 via the first feeding mechanism 20, and delivered and sorted along the first direction D1, another part of the goods 100 can be delivered to the lower layer of the delivery mechanism 10 via the second feeding mechanism 30, and delivered and sorted in the second direction D2.

Therefore, the dual-layer linear sorter of the present disclosure is designed with a left-middle-right structure for the delivery mechanism 10, the left and right structures are respectively combined with the slewing mechanism 40 and the driving mechanism 50, the middle structure is the delivery part, and is divided into an upper layer and a lower layer, which are respectively docked with the first feeding mechanism 20 and the second feeding mechanism 30, so that the upper and lower layers can simultaneously deliver the goods 100 to be sorted. Compared with the existing single-layer delivering sorter, the present disclosure realizes simultaneous delivering of the upper and lower layers, which doubles the sorting efficiency and improves the utilization rate of the sorter, it is especially suitable for sorting centers with narrow and long venues and large processing capacity requirements. Compared with the existing sorter with the same sorting capacity, the dual-layer linear sorter of the present disclosure can reduce its occupied space by half, thereby facilitating the miniaturization of the equipment and reducing the production cost.

Figure 4:
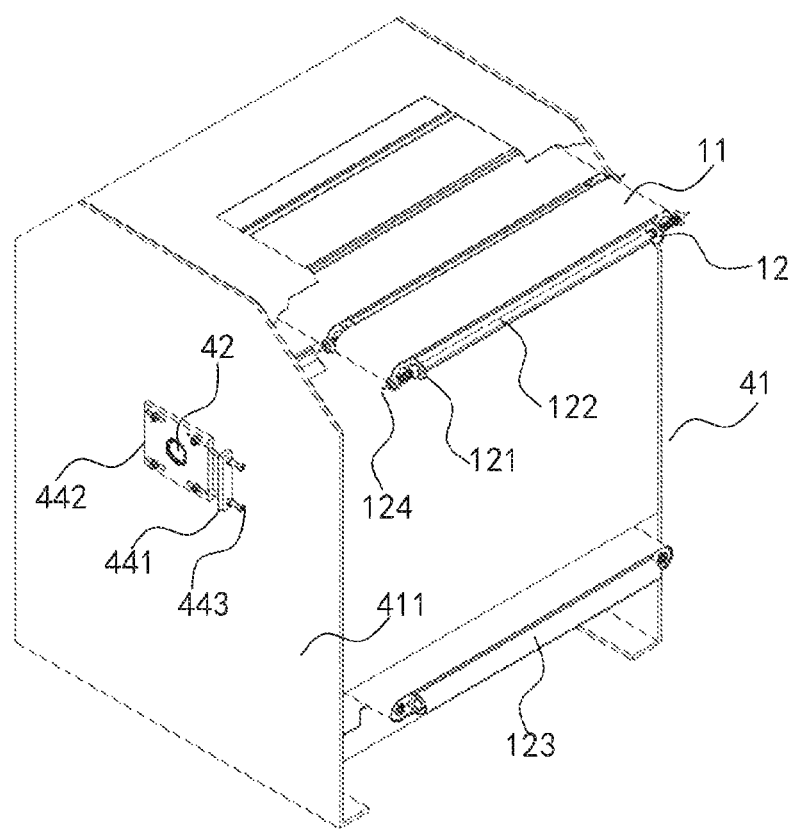
FIG. 4 is a perspective view of a slewing mechanism of a dual-layer linear sorter according to one or more embodiment of the present disclosure.
Figure 5:
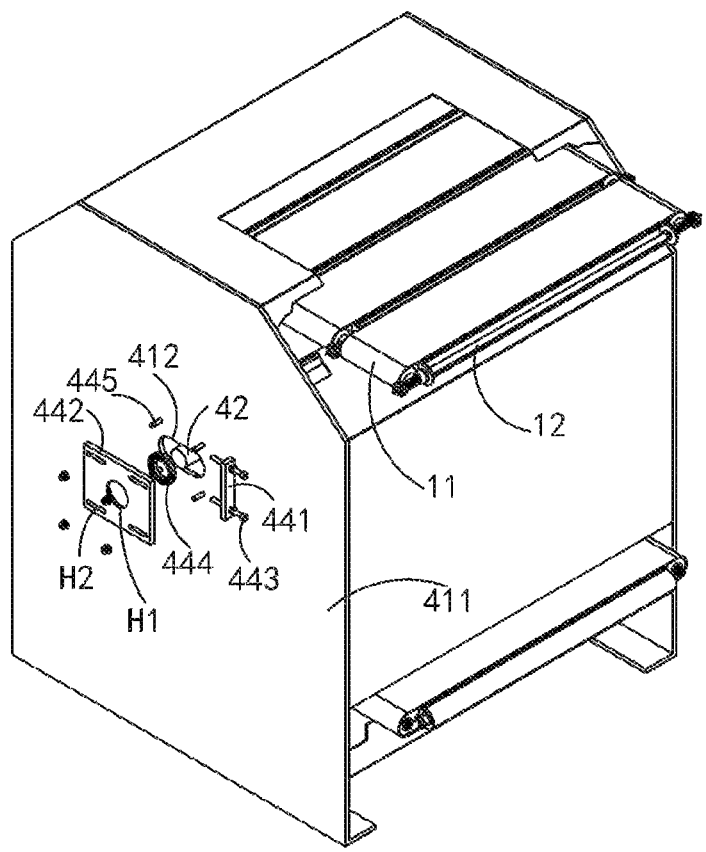
FIG. 5 is a partial exploded view of a slewing mechanism of a dual-layer linear sorter according to one or more embodiment of the present disclosure.
Figure 6:
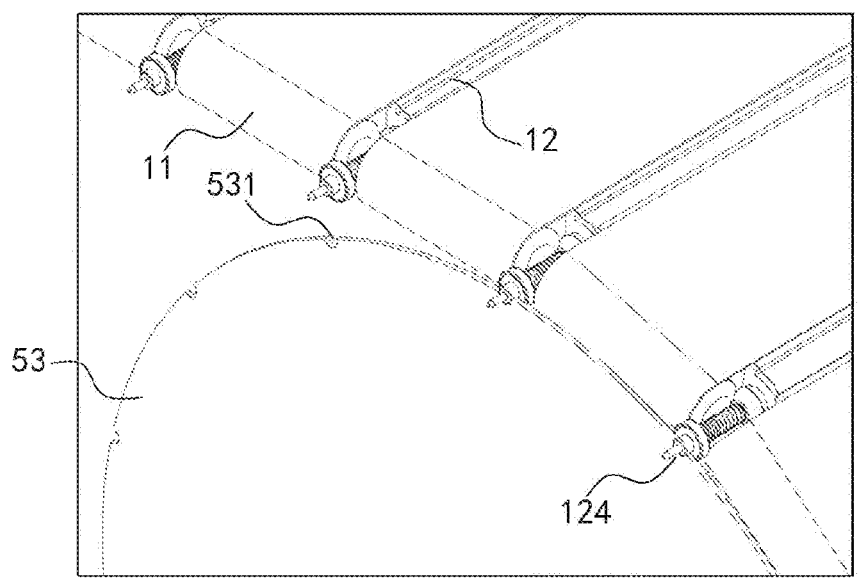
FIG. 6 is a partial perspective view of a slewing mechanism and a delivery mechanism of a dual-layer linear sorter according to one or more embodiment of the present disclosure.

In this embodiment, as shown in FIGS. 4-6, the delivery mechanism 10 may include a plurality of delivery units 11 and a plurality of hinge parts 12, adjacent delivery units 11 are hinged through one hinge part 12 so that the delivery mechanism 10 is surrounded between the slewing mechanism 40 and the driving mechanism 50.

Where, as shown in FIGS. 4 and 6, the hinge part 12 may include a pair of mounting bases 121, a hinge shaft 122, a shaft sleeve 123 and an alignment portion 124, a mounting base 121 and a hinge shaft 122 are provided on one side of one of the two adjacent delivery units 11, the hinge shaft 122 is detachably connected between the pair of mounting bases 121, an alignment portion 124 is provided on a side of each mounting base 121 facing away from the hinge shaft 122, and one end of the alignment portion 124 protrudes from the delivery unit 11 along the axial direction of the hinge shaft 122; a shaft sleeve 123 is provided on one side of one of the two adjacent delivery units 11; the hinge shaft 122 is movably sleeved in the shaft sleeve 123, thereby enabling the two adjacent delivery units 11 to rotate relatively.

It should be noted that the connection way of the delivery units 11 is not limited to this, and the delivery mechanism 10 is not limited to this, and may be a conveying belt, a chain, etc., for example.

Figure 3:
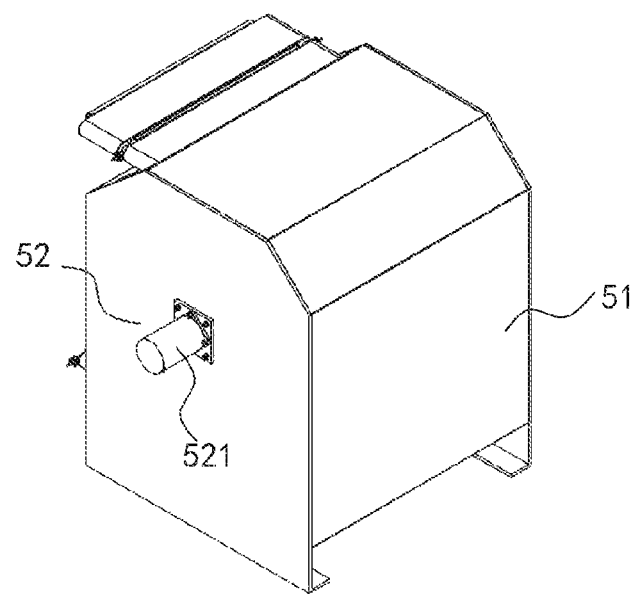
FIG. 3 is a perspective view of a driving mechanism of a dual-layer linear sorter according to one or more embodiment of the present disclosure.

In this embodiment, as shown in FIGS. 1, 3, and 6, the driving mechanism 50 is connected to the other end of the delivery mechanism 10, the driving mechanism 50 may include a driving housing 51, a motor 52 and a pair of first turntables 53, the motor 52 and the first turntables 53 are accommodated in the driving housing 51, and the driving shaft 521 of the motor 52 is connected to the centers of the first turntables 53. The outer periphery of the first turntable 53 is provided with a plurality of first grooves 531 that cooperate with the alignment portions 124, and the plurality of alignment portions 124 at the other end of the delivery mechanism 10 are respectively accommodated in the first grooves 531. During the operation of the motor 52, the driving shaft 521 drives the first turntable 53 to rotate, and during the rotation of the first turntable 53, the first grooves 531 drive the alignment portions 124 that are aligned therewith to rotate synchronously, the aligning portion 124 enter the first grooves 531 aligned therewith one by one, thereby driving the delivery unit 11 to deliver.

Where, a plurality of evenly spaced first grooves 531 can be provided on the outer periphery of the first turntable 53, the distance between two adjacent first grooves 531 is equal to the distance between two adjacent alignment portions 124. The number and distance of the first grooves 531 can be changed accordingly as needed.

Figure 7:
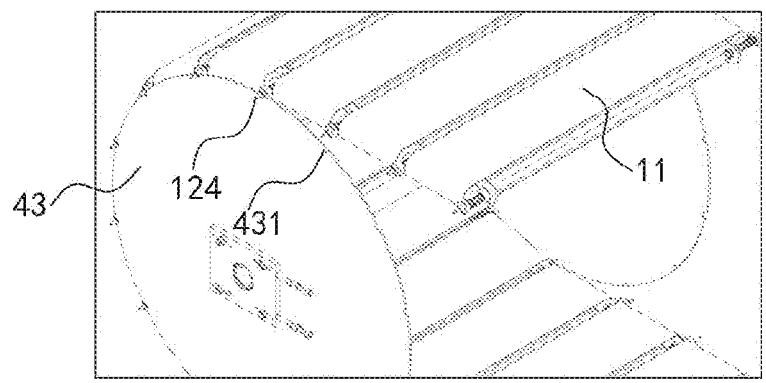
FIG. 7 is a partial perspective view of a driving mechanism and a delivery mechanism of a dual-layer linear sorter according to one or more embodiment of the present disclosure.
Figure 8:
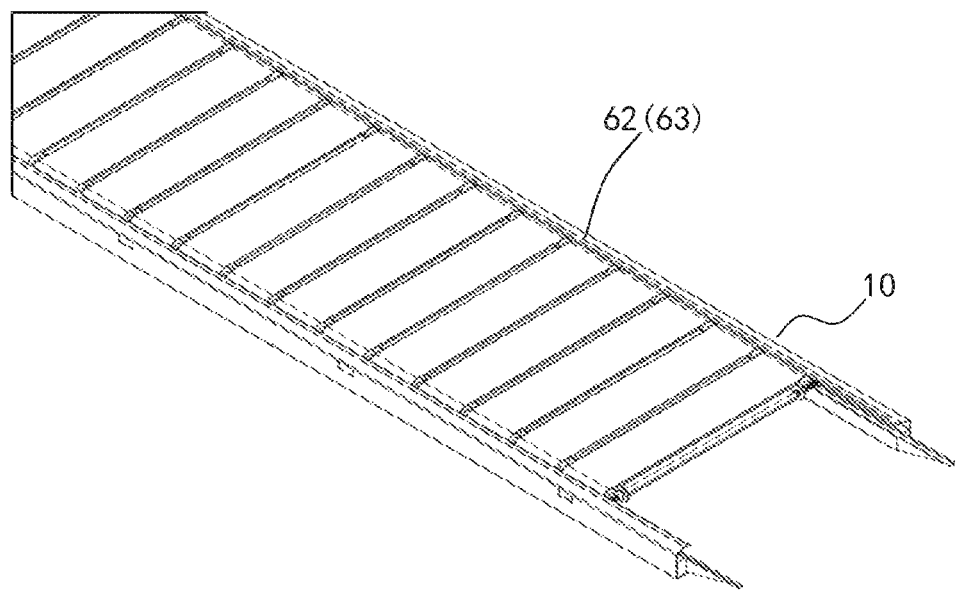
FIG. 8 is a partial perspective view of a track and a delivery mechanism of a dual-layer linear sorter according to one or more embodiment of the present disclosure.
Figure 9:
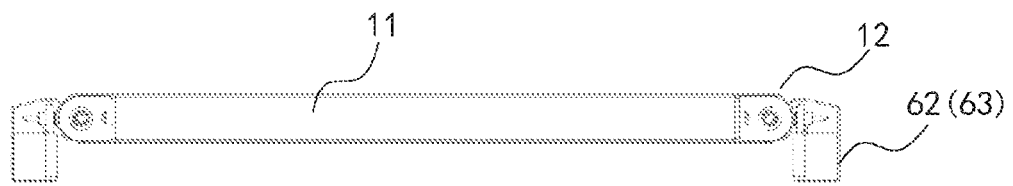
FIG. 9 is a partial side view of a track and a delivery mechanism of a dual-layer linear sorter according to one or more embodiment of the present disclosure.

In this embodiment, as shown in FIGS. 4, 5, and 7, the slewing mechanism 40 is connected to one end of the delivery mechanism 10, the slewing mechanism 40 includes a slewing housing 41, a slewing shaft 42 and a second turntable 43, the second turntable 43 and the slewing shaft 42 are accommodated in the slewing housing 41, and the slewing shaft 42 is connected to the center of the second turntable 43, the outer periphery of the second turntable 43 is provided with a plurality of second grooves 431 that cooperate with alignment portions 124, the plurality of alignment portions 124 at one end of the delivery mechanism 10 are respectively accommodated in the second grooves 431 correspondingly. The delivery mechanism 10 is delivered under the action of the driving mechanism 50, during the movement of the delivery unit 11, the positioning portions 124 enter the second grooves 431 aligned therewith one by one, thereby driving the second turntables 43 to rotate. Where, as shown in FIG. 7, there can be a pair of second turntables 43.

Where, the second turntable 43 is similar to the first turntable 53, and the alignment relationship and principle between the second groove 431 and the alignment portion 124 are similar to the alignment relationship and principle between the second groove 431 and the alignment portion 124 of the driving mechanism 50.

Through the transmission of the driving mechanism 50 and the slewing mechanism 40 at both ends, the groove of the turntable is aligned with the alignment portion 124 of the transfer unit 11, so that the delivery mechanism moves smoothly. The motor 52 can have a variety of speeds to obtain a variety of sorting speeds of the sorter.

Where, as shown in FIG. 5, the slewing housing 41 may include a vertical plate 411, and the vertical plate 411 covers the outside of the second turntable 43, at a position corresponding to the slewing shaft 42, a long hole 412 is opened on the vertical plate 411; the slewing mechanism 40 also includes an adjustment assembly, which includes a fixed plate 441, a movable plate 442 and an adjuster 443, the fixed plate 441 is fixed to the vertical plate 411, and the slewing shaft 42 and the movable plate 442 are connected by a bearing 444, the adjuster 443 connects the fixed plate 441 and the movable plate 442, and can drive the movable plate 442 to move in the first direction D1 or the second direction D2, so that the slewing shaft 42 moves within the length range of the long hole 412, thereby driving one end of the delivery mechanism to move in the first direction D1 or the second direction D2 relative to the other end of the delivery mechanism.

Where, the movable plate 442 is provided with a through hole H1 located at the center of the movable plate 442 and a long adjusting hole H2 located at the periphery of the movable plate 442, the bearing 444 and the end portion of the slewing shaft 42 are arranged in the through hole H1, the bolts 445 pass through the long adjusting hole H2 and abut against the vertical plate 411, the adjuster 443 passes through the fixed plate 441 and can move relative to the fixed plate 441, and one end of the adjuster 443 is fixed to the movable plate 442.

Where, the adjuster 443 and the fixed plate 441 may be screwed together, the relative position between the adjuster 443 and the fixed plate 441 can be changed by rotating the adjuster 443.

By pulling the other end of the adjuster 443, the movable plate 442 can be driven to move, thereby driving the slewing shaft 42 to move back and forth, correspondingly, the second turntables 43 moves back and forth. Therefore, if there is a problem of slack in the delivery mechanism 10 after long-term use, the second turntables 43 can be pushed in a direction away from the driving mechanism 50, so that both the upper and lower layers of the delivery mechanism 10 are tensioned, so that the goods 100 can be delivered on the delivery mechanism 10 smoothly and quickly.

As shown in FIGS. 1, 2, 8, and 9, the dual-layer linear sorter can also include a frame mechanism, the frame mechanism includes a supporting portion 61, an upper track 62, a lower track 63 and a sliding groove 64, the upper track 62 and the lower track 63 are supported by the supporting portion 61 and are used for the delivery mechanism 10 to run, the upper track 62 is provided on the upper layer of the delivery mechanism 10, and the lower track 63 is provided on the lower layer of the delivery mechanism 10, both ends of the upper track 62 and both ends of the lower track 63 are respectively connected to the slewing housing 41 and the driving housing 51, a plurality of sliding grooves 64 are provided on both sides of the upper track 62 and the lower track 63 for receiving the sorted goods 100.

Where, the first feeding mechanism 20 includes a first feeding section 21 and a first scanning unit 22, the first feeding section 21 is docked with the other end of the delivery mechanism 10 and extends along the extension direction of the upper track 62, a part of the first feeding section 21 is located on the slewing housing 41; the first scanning unit 22 is located on the first feeding section 21, and the first scanning unit 22 can be installed parallel to the running direction of the delivery mechanism 10.

The second feeding mechanism 30 includes a second feeding section 31, a turning section 32 and a second scanning unit 33, one end of the second feeding section 31 extends beyond one side of the lower layer of the delivery mechanism 10, the turning section 32 is connected to the other end of the second feeding section 31 and extends to the upper side of the lower layer of the delivery mechanism 10 through the turning section 32; the second scanning unit 33 is located between the upper layer of the delivery mechanism 10 and the lower layer of the delivery mechanism 10.

That is to say, the other end of the lower layer of the delivery mechanism 10 is blocked by the driving mechanism 50, and the second feeding mechanism 30 cannot directly dock with the other end of the lower layer of the delivery mechanism 10. Therefore, the second feeding mechanism 30 of this embodiment is designed as the following structure: the second feeding section 31 first forms an angle with the sorter, and then turns an angle through the turning section 32 to extend to the upper side of the lower layer of the delivery mechanism 10 and continue to extend along the delivering direction.

Hereinafter, the sorting principle will be explained by taking the upper layer of the delivery mechanism 10 as an example.

The goods 100 are transported from the first feeding section 21 to the upper layer of the delivery mechanism 10, and the first scanning unit 22 located above scans the barcode information on the goods 100 and inquires the destination in the warehouse management system (WMS). According to the size of the delivery unit 11 and the number occupied, the sorter judges how many delivery units 11 are needed to unload the goods 100, when the delivery mechanism 10 runs to the sliding groove 64 of the designated destination, the delivery units 11 under the goods 100 acts to unload the goods 100 to the corresponding sliding groove 64.

The delivering principle of the lower layer of the delivery mechanism 10 is similar to the delivering principle of the upper layer of the delivery mechanism 10, except that the directions of the two are opposite, and the positions of the feeding mechanisms and the scanning units are different, so it is not repeated here.

In summary, the dual-layer linear sorter of the present disclosure is designed with a left-middle-right structure for the delivery mechanism, the left and right structures are respectively combined with the slewing mechanism and the driving mechanism, the middle structure is the delivery part, and is divided into an upper layer and a lower layer, which are respectively docked with the first feeding mechanism and the second feeding mechanism, so that the upper and lower layers can simultaneously deliver the goods to be sorted. Compared with the existing single-layer delivering sorter, the present disclosure realizes simultaneous delivering of the upper and lower layers, which doubles the sorting efficiency and improves the utilization rate of the sorter, it is especially suitable for sorting centers with narrow and long venues and large processing capacity requirements. Compared with the existing sorter with the same sorting capacity, the dual-layer linear sorter of the present disclosure can reduce its occupied space by half, thereby facilitating the miniaturization of the equipment and reducing the production cost.

Although the present disclosure has been described with reference to a few typical embodiments, it should be understood that the terms used are illustrative and exemplary rather than restrictive. Since the present disclosure can be implemented in various forms without departing from the spirit or essence of the disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A dual-layer linear sorter, comprising:
a delivery mechanism being ring-shaped and configured to comprise an upper layer and a lower layer, wherein a running direction of the upper layer is a first direction, and a running direction of the lower layer is a second direction, the first direction is from one end of the delivery mechanism to the other end of the delivery mechanism, and the second direction is opposite to the first direction; wherein the delivery mechanism comprises a plurality of delivery units and a plurality of hinge parts, adjacent delivery units are hinged through one hinge part, the hinge part comprises a pair of mounting bases, a hinge shaft, a shaft sleeve and an alignment portion, a mounting base and a hinge shaft are provided on one side of one of the two adjacent delivery units, the hinge shaft is detachably connected between the pair of mounting bases, the alignment portion is provided on a side of each mounting base facing away from the hinge shaft, and one end of the alignment portion protrudes from the delivery units along an axial direction of the hinge shaft; the shaft sleeve is provided on one side of one of the two adjacent delivery units; the hinge shaft is movably sleeved in the shaft sleeve;
a first feeding mechanism being close to the upper layer of the delivery mechanism and being docked with one end of the delivery mechanism;
a second feeding mechanism being close to the lower layer of the delivery mechanism and being docked with the other end of the delivery mechanism;
a slewing mechanism being connected to one end of the delivery mechanism; and
a driving mechanism being connected to the other end of the delivery mechanism;
wherein the driving mechanism is configured to drive the delivery mechanism to circulate in a loop between the driving mechanism and the slewing mechanism, a part of goods are delivered to the upper layer of the delivery mechanism via the first feeding mechanism, and are delivered and sorted along the first direction, another part of the goods are delivered to the lower layer of the delivery mechanism via the second feeding mechanism, and delivered and sorted in the second direction.

2. The dual-layer linear sorter according to claim 1, wherein the driving mechanism is connected to the other end of the delivery mechanism, the driving mechanism comprises a driving housing, a motor and a pair of first turntables, the motor and the first turntables are accommodated in the driving housing, and a driving shaft of the motor is connected to centers of the first turntables, an outer periphery of each of the first turntables is provided with a plurality of first grooves that cooperate with alignment portions, and a plurality of alignment portions at the other end of the delivery mechanism are respectively accommodated in the first grooves, during an operation of the motor, the driving shaft drives the first turntables to rotate, thereby driving the delivery units to deliver.

3. The dual-layer linear sorter according to claim 2, wherein a plurality of evenly spaced first grooves are provided on the outer periphery of each of the first turntables, a distance between two adjacent first grooves is equal to a distance between two adjacent alignment portions.

4. The dual-layer linear sorter according to claim 2, wherein the slewing mechanism is connected to one end of the delivery mechanism, the slewing mechanism comprises a slewing housing, a slewing shaft and a second turntable, the second turntable and the slewing shaft are accommodated in the slewing housing, and the slewing shaft is connected to a center of the second turntable, an outer periphery of the second turntable is provided with a plurality of second grooves that cooperate with alignment portions, a plurality of alignment portions at one end of the delivery mechanism are respectively accommodated in the second grooves correspondingly, during a delivering process of the delivery mechanism, the delivery units drives the second turntable to rotate.

5. The dual-layer linear sorter according to claim 4, wherein the slewing housing comprises a vertical plate, and the vertical plate covers the outside of the second turntable, at a position corresponding to the slewing shaft, a long hole is opened on the vertical plate; the slewing mechanism also comprises an adjustment assembly, the adjustment assembly comprises a fixed plate, a movable plate and an adjuster, the fixed plate is fixed to the vertical plate, and the slewing shaft and the movable plate are connected by a bearing, the adjuster connects the fixed plate and the movable plate, and drive the movable plate to move in the first direction or the second direction, so that the slewing shaft moves within a length range of the long hole, thereby driving one end of the delivery mechanism to move in the first direction or the second direction relative to the other end of the delivery mechanism.

6. The dual-layer linear sorter according to claim 5, wherein the movable plate is provided with a through hole located at a center of the movable plate and a long adjusting hole located at a periphery of the movable plate, the bearing and an end portion of the slewing shaft are arranged in the through hole, bolts pass through the long adjusting hole and abut against the vertical plate, the adjuster passes through the fixed plate and is configured to move relative to the fixed plate, and one end of the adjuster is fixed to the movable plate, by pulling the other end of the adjuster, the movable plate is driven to move.

7. The dual-layer linear sorter according to claim 4, further comprising:
a frame mechanism comprising a supporting portion, an upper track, a lower track and a sliding groove, wherein the upper track and the lower track are supported by a supporting portion and are used for the delivery mechanism to run, the upper track is provided on the upper layer of the delivery mechanism, and the lower track is provided on the lower layer of the delivery mechanism, both ends of the upper track and both ends of the lower track are respectively connected to the slewing housing and the driving housing, a plurality of sliding grooves are provided on both sides of the upper track and the lower track for receiving sorted goods.

8. The dual-layer linear sorter according to claim 7, wherein the first feeding mechanism comprises a first feeding section and a first scanning unit, the first feeding section is docked with the other end of the delivery mechanism and extends along an extension direction of the upper track, a part of the first feeding section is located on the slewing housing; the first scanning unit is located on the first feeding section.

9. The dual-layer linear sorter according to claim 7, wherein the second feeding mechanism comprises a second feeding section, a turning section and a second scanning unit, one end of the second feeding section extends beyond one side of the lower layer of the delivery mechanism, the turning section is connected to the other end of the second feeding section and extends to an upper side of the lower layer of the delivery mechanism through the turning section;

the second scanning unit is located between the upper layer of the delivery mechanism and the lower layer of the delivery mechanism.

* * * * *